United States Patent [19]

Tahara

[11] Patent Number: 4,837,602
[45] Date of Patent: Jun. 6, 1989

[54] PHOTOGRAPHIC PRINTER MAKING DIFFERENTLY-SIZED PRINTS

[75] Inventor: Syuji Tahara, Kanagawa, Japan

[73] Assignee: Fuji Photo Film Co., Ltd., Kanagawa, Japan

[21] Appl. No.: 164,167

[22] Filed: Mar. 4, 1988

[30] Foreign Application Priority Data

Mar. 6, 1987 [JP] Japan .................................. 62-51408

[51] Int. Cl.⁴ ...................... G03B 29/00; G03B 27/44; G03B 27/52
[52] U.S. Cl. ........................................ 355/29; 355/46; 355/55
[58] Field of Search ...................... 355/28, 29, 44, 46, 355/55, 56

[56] References Cited

U.S. PATENT DOCUMENTS

| | | | |
|---|---|---|---|
| 3,563,637 | 2/1971 | Ferguson | 355/46 X |
| 3,649,121 | 3/1972 | Cohen | 355/46 X |
| 3,689,149 | 9/1972 | Livingood | 355/46 |
| 3,792,926 | 2/1974 | Knechtel et al. | 355/29 |
| 4,616,925 | 10/1986 | Saito et al. | 355/29 X |
| 4,655,583 | 4/1987 | Kitai et al. | 355/29 |
| 4,678,311 | 7/1987 | Loce et al. | 355/46 X |
| 4,692,015 | 9/1987 | Loce et al. | 355/46 X |
| 4,737,825 | 4/1988 | Davis | 355/46 X |
| 4,748,476 | 5/1988 | Nakao | 355/46 |
| 4,757,353 | 7/1988 | Kitai et al. | 355/44 |

Primary Examiner—Richard A. Wintercorn
Attorney, Agent, or Firm—Sughrue, Mion, Zinn, Macpeak, and Seas

[57] ABSTRACT

A photographic printer has a printing section capable of having selectively mounted therein a plurality of printing lenses with different magnifications, to form various sizes of image frames on photographic paper. The printer also includes a processing section for developing, bleaching-fixing and rinsing the photographic paper exposed in the printing section, and a cutter unit for cutting the exposed and developed photographic paper to provide separate prints. The photographic printer has a lens mounting mechanism which enables selective mounting of the plurality of printing lenses with their optical axes perpendicular to a plane onto which images are projected by the printing lenses, and with their exposure axes inclined at different angles according to their magnifications with respect to the plane.

9 Claims, 5 Drawing Sheets

… L_{n-1}, L_n$ are printed consecutively with a margin R of width 2M left between adjacent L-size image frames. After the Nth L-size image frame $L_n$ has been exposed, the exposed photographic paper P is cut off by a cutter C along a cutting line CL, leaving an end margin RL of width M along the rear edge thereof. The exposed photographic paper then the separated from the unexposed photographic paper P. This exposed part of the photographic paper P is continuously processed from developing to rinsing in a processor, dried by a dryer, and then cut off by a cutter unit into L-size image frame prints with front and rear margins M left on both ends.

PHOTOGRAPHIC PRINTER MAKING DIFFERENTLY-SIZED PRINTS

BACKGROUND OF THE INVENTION

The present invention relates to a photographic printer, and more particularly to a printer-processor which can make different sizes of prints.

Various types of photographic printer-processors are known which can make a large number or prints easily. Such printer-processors, which are found in many processing mini-labs, primarily comprise a printing section, a processing section, and a cutter unit.

The printing section is provided with a light source for illuminating an original film, such as a negative or a reversal film, held by a negative carrier. The printing section also includes an exposure system, including at least a printing lens and a shutter, for projecting an image of an original film frame onto photographic paper which is placed at an exposure station, so as to form a latent image on the photographic paper.

An image recorded on the original film may be measured by equipment such as an optical scanner to detect the intensity or the amount of light passed therethrough, in accordance with which proper exposure may be determined automatically. Exposure may be repeated one or more times consecutively for each frame of the original film in order to make a large number of prints.

The exposed photographic paper is cut by a first cutter to a predetermined length usually sufficient to include a plurality of image frames, and is transported to the processing section of the printer processor for continuous processing, including the steps of developing, bleaching-fixing and washing or rinsing. The exposed and processed photographic paper then is cut to a predetermined length by a second cutter in the cutter unit to provide individual prints framed by white margins.

Meanwhile, as is well known in the art, there are various types of printer-processors which use a plurality of interchangeable printing lenses having different focal lengths or printing magnifications in order to make different sizes of image frames for prints. These printing lenses are interchangeably mounted on a lens mount of the printer-processor so that the exposure axis (which, in this specification, is a straight line connecting the centers of a printing lens and an image frame projected by the printing lens) of each printing lens coincides with the optical axis of the printing lens which is perpendicular to a plane onto which an image of an original film is projected. Exposure aperture size and the length of photographic paper advancement or withdrawal are changed in accordance with a change in print size.

The printer-processor is provided with a stationary cutter disposed after the exposure station, adjacent to the exposure aperture, for cutting off an exposed part of the photographic paper. A problem associated with printer-processors with stationary cutters is different widths of end margins formed when different sizes of prints are produced.

As shown in FIG. 1, when printing a large size image frame (hereinafter referred to as an L-size image frame and which has a diagonal length twice as long as that of a small size, or S-size image (frame) on a web-like photographic paper P, a plurality of L-size image frames $L_1, …, L_{n-1}, L_n$ are printed consecutively with a margin R of width 2M left between adjacent L-size image frames. After the Nth L-size image frame $L_n$ has been exposed, the exposed photographic paper P is cut off by a cutter C along a cutting line CL, leaving an end margin RL of width M along the rear edge thereof. The exposed photographic paper then the separated from the unexposed photographic paper P. This exposed part of the photographic paper P is continuously processed from developing to rinsing in a processor, dried by a dryer, and then cut off by a cutter unit into L-size image frame prints with front and rear margins M left on both ends.

When making more L-size image frame prints, either from the same original film or from another original film, the same printing and processing operations may be repeated without any need for adjustment of elements of the printing section. Cutting of the photographic paper generally is carried out in accordance with information relating to a predetermined number of prints, and the size of each frame.

One type of problem which can arise during operation of a printer-processor as described above occurs when a different size of print is desires. For example, if S-size image frame prints are needed after L-size image frame prints, as is shown in FIG. 1, between the first S-size image frame and the front edge of the photographic paper P or the cutting line CL, there is left a margin Rs which is quite a bit wider than the ordinary width M. This is because, while the print size has been changed, the printer-processor has not adjusted its advancement operation to compensate accordingly.

To prevent recurrence of such a wide margin, the withdrawal length or advancement length of the photographic paper is changed and printing then is resumed, starting with the second S-size image frame $S_2$. Specifically, the advancement length of the photographic paper is changed to the total length of the length of one S-size image frame and the ordinary widths (2M) of front and rear margins.

After exposure of the last S-size image frame $S_n$, the photographic paper P is automatically advanced by the changed length and then is cut by the cutter C. However, as is apparent from FIG. 1, because of the excessively large initial margin Rs, a rear part of the last S-size image frame $S_n$ is cut off along a double dotted line CL by the cutter C, resulting in a defective, shortened print. In order to prevent such a defective print, it is necessary to advance the photographic paper excessively after the exposure of the last S-size image frame $S_n$.

As described above, in conventional printer-processors, there is a problem that, when printing a plurality of S-size image frames, unnecessarily width margins are left along the front and rear sides of the exposed photographic paper. Therefore, when making S-size image frame prints after L-size image frame prints, a manual operation to take an unnecessary front margin away from an exposed part of the photographic paper has to be conducted in order for the cutter unit automatically to cut and separate the printed photographic paper into individual S-size image frame prints. Such a manual cutting operation is troublesome when the printer-processor is automatically making a large number or prints. Further, the unnecessary margins are wasteful and result in a great amount of wasted, unused photographic paper, In order to avoid such a waste of unused photographic paper, after the exposed photographic paper has been cut off from the major part of the photographic paper after having exposed all of the L-size image frames $L_1, \ldots, L_{n-1}$, and $L_n$, the photographic paper P is moved back by a predetermined length in order to avoid an unnecessary margin in the first S-size image frame $S_1$. When the photographic paper P is cut off by the cutter C for every exposure of S-size image frame, the photographic paper P has to be moved back by the predetermined length for every exposure and cutting. Furthermore, in any case, when cutting the exposed photographic paper R after in exposure of the last S-size image frame $S_n$, the photographic paper P has to be forwarded additionally to be cut with a proper margin in the last S-size image frame $S_n$.

As described above, in conventional printer-processors, it has been required to move the photographic paper back before exposing the first S-size image frame or move the paper forward an additional amount after the exposure of the last S-size image frame $S_n$, when making a plurality of successive S-size image frame prints. These operations also are required in making S-size image frame prints one by one. To enable reverse movement or additional advancement of photographic paper, it is necessary to provide an advancing mechanism, with its associated mechanical elements, for reversing and additional advancing of photographic paper as well as for normal advancing of the photographic paper. Such a photographic paper advancing mechanism unavoidably becomes complicated and results in inconsistent advancement of photographic paper.

SUMMARY OF THE INVENTION

In view of the foregoing, one object of the present invention is to provide a printer-processor which can form a predetermined width of margin in a printer, independent of print size.

It is another object of the present invention to provide a printer-processor in which no special photographic paper advancing mechanism is needed in order to form a predetermined width of margin in a print independent of print size.

The above and other objects of the present invention are achieved in an inventive printer-processor which includes a plurality of printing lenses, having different focal lengths or magnification ratios, interchangeably mounted thereto, and a cutter disposed adjacent to an exposure station for cutting an exposed part of a photographic paper after having exposed a plurality of image frames. Each of the printing lenses is mounted with its optical axis perpendicular to an image printing plane onto which an image to be printed is projected thereby, with its exposure axis inclined with respect to the image printing plane in accordance with a printing image size.

According to one feature of the present invention, the interchangeably mounted printing lenses have their optical axes perpendicular to the image printing plane onto which an image is projected and their exposure axes (which are straight lines connecting the centers of the printing lenses and image frames projected by these printing lenses) inclined at different angles in accordance with lens magnification. As a result, front sides of printed image frames adjacent to the cutter are positioned on a fixed line independent of printing image sizes, corresponding to printing lens magnifications. Therefore, various image sizes of prints can be made with identical margins, resulting in savings of photographic paper. Furthermore, because it is not necessary to provide an advancing mechanism for reversing the photographic paper, the photographic paper can be advanced with stability.

DETAILED DESCRIPTION OF THE PREFERRED EMBODIMENTS

Figure 1:
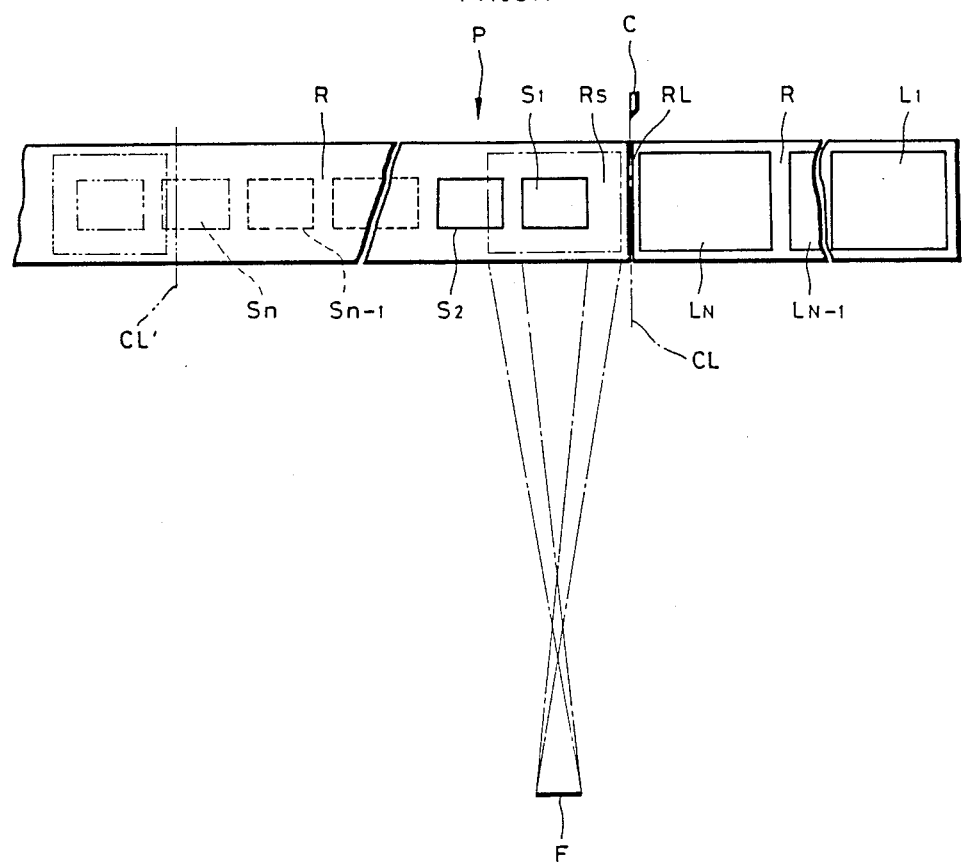
FIG. 1 shows printed image frames made by a conventional printer-processor.
Figure 2:
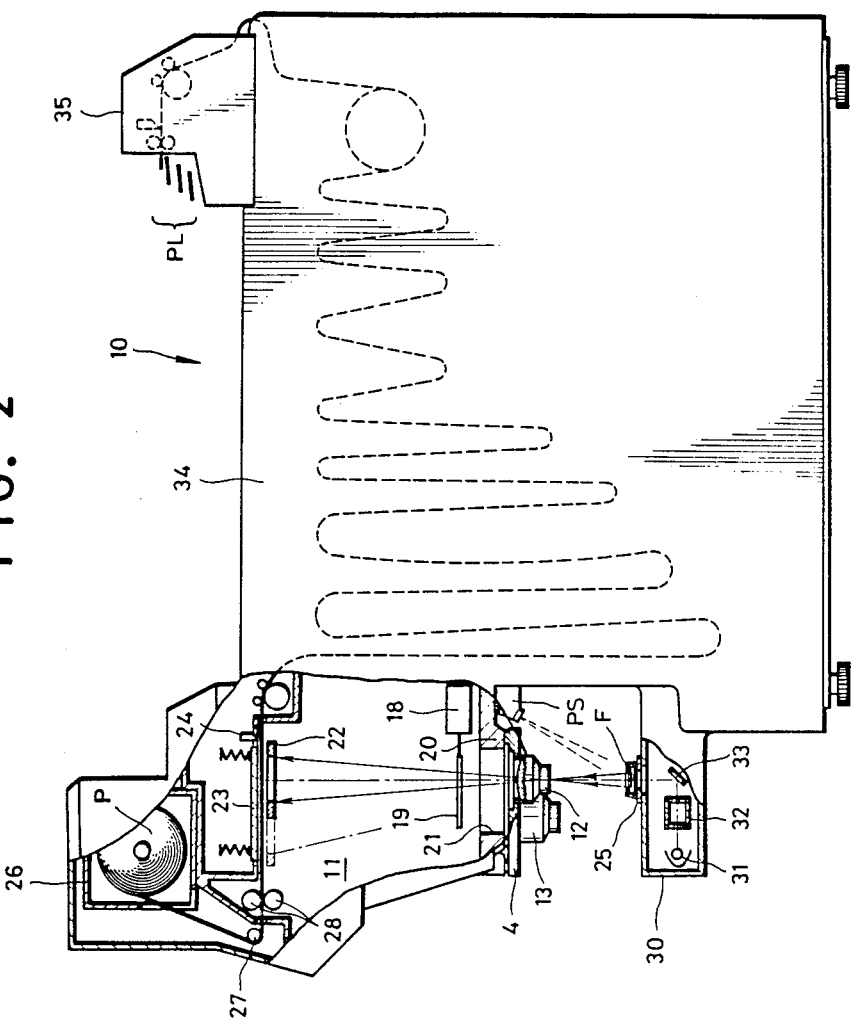
FIG. 2 is a schematic illustration, partially in cross section, showing a printer-processor according to an embodiment of the present invention.

FIG. 2 shows a printer-processor 10 embodying the present invention. The printer-processor 10 includes an exposure section 11, as well known processing section 34 partly connected to the exposure section 11, and a cutter unit 35 disposed on the housing of the processing section 34. Under the exposure section 11, there is a projection light unit 30 on which a negative carrier 25 is placed to hold flat an original film, for example a negative film F. A housing of the projection light unit 30 encloses a white light source 31, a mirror box 32 for uniformly mixing and diffusing a light emanating from the white light source 31, and a reflection mirror 33 for reflecting and directing the light passed through the mirror box 32 to the negative film F placed in the negative carrier 25.

An exchangeable magazine 26 containing a roll of photographic paper P is mounted on a housing of the exposure section 11. The photographic paper P is withdrawn intermittently from the magazine 26 by a pair of paper feeding rollers 28 through a guide roller 27, so as to place another unexposed part of the photographic paper P in position for exposure in the exposure section 11. The exposure section 11 includes a changeable exposure mask 22 and a pressure plate 23, by which the exposure opening is formed at the exposure station, and an optical projecting system for exposing the photographic paper P to the negative film F. This optical projecting system comprises interchangeable projecting or printing lenses 12 and 13 and a shutter controller 18 which controls opening and closing of a shutter 19. The printing lenses 12 and 13, which are different in focal length or magnification ratio, are mounted on a V-shaped lens board 4 pivotally mounted on the housing of the printing section 11 for selective placement in the optical axis of the projecting system in accordance with printing image size.

Figure 3:
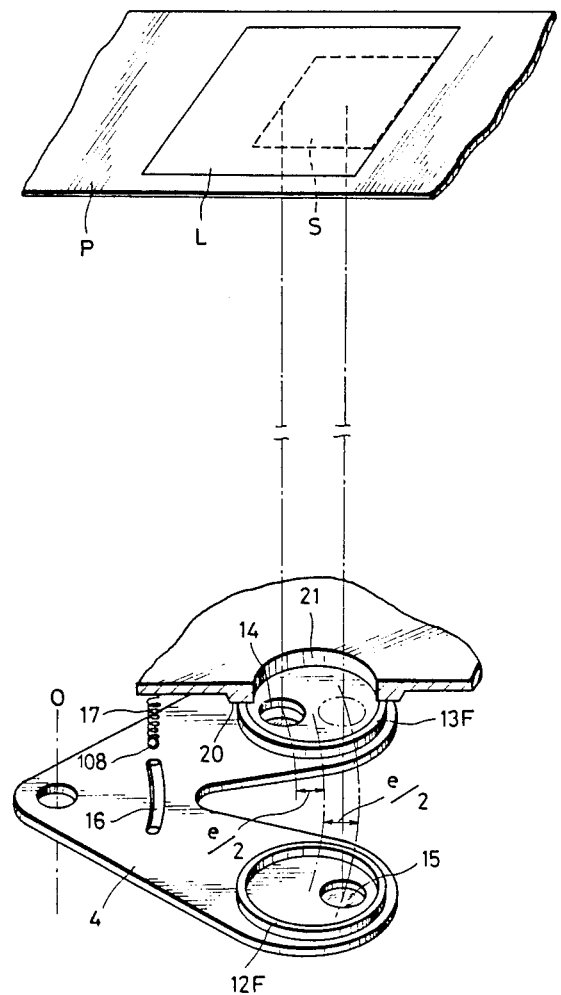
FIG. 3 is an exploded schematic illustration showing an example of a printing lens mounting device incorporated in the printer-processor of FIG. 2 for interchangeably mounting printing lenses.

As shown in FIG. 3, in the V-shaped lens board 4 there are formed circular flanges 12F and 13F which have their centers equidistant from the rotational axis O of the lens board 4 and have identical diameters and flange heights. Openings 14 and 15 are respectively formed inside the flanges 12F and 13F on the lens board 4. The centers of these openings 14 and 15 are displaced by a distance e/2 in directions opposite each other along a straight line connecting the axis O and the center of each flange 12F, 13F. On the back side of the openings 14 and 15 there are lens mounts (not shown) for mounting printing lenses 12 and 13 providing a small and a large magnification, respectively.

On the upper surface of the lens board 4 there is formed a circular arcuate groove 16 whose radius of curvature extends from the rotational axis O. Between the lens board 4 and the bottom of the housing of the printing section 11 there is a click stop mechanism consisting of a steel ball 108 rolling in the groove 16 and a spring 17. Such a click stop mechanism is well known in the art. This click stop mechanism functions to releasably retain the lens board 4 at its opposite extremes of movement so as to align the flanges 12F and 13F with a mounting flange 20 formed on the bottom of the housing of the printing section 11. As shown in FIG. 3, this mounting flange 20 encircles an opening 21 which is enough large to pass light passed through each printing lens 12, 13 without vignetting, or interfering with passage of light.

The variable exposure mask 22 is adapted to have a smaller masking size, as shown by a solid line in FIG. 2, when the small magnification printing lens 12 is placed in the printing optical axis. The masking size also may be larger, as shown by a dotted line in FIG. 2, when the larger magnification printing lens 13 is placed in the printing optical axis. This change of masking size may be effected either manually or in cooperation with exchanging the printing lenses 12 and 13. Alternatively, two different sizes of exposure masks may be used interchangeably in place of the variable exposure mask 22. In changing masking size, the variable exposure mask 22 is expanded by moving its three side frames with respect to the fixed side frame adjacent the processing section, and in particular with respect to a stationary cutter 24 which will be described later.

Figure 4:
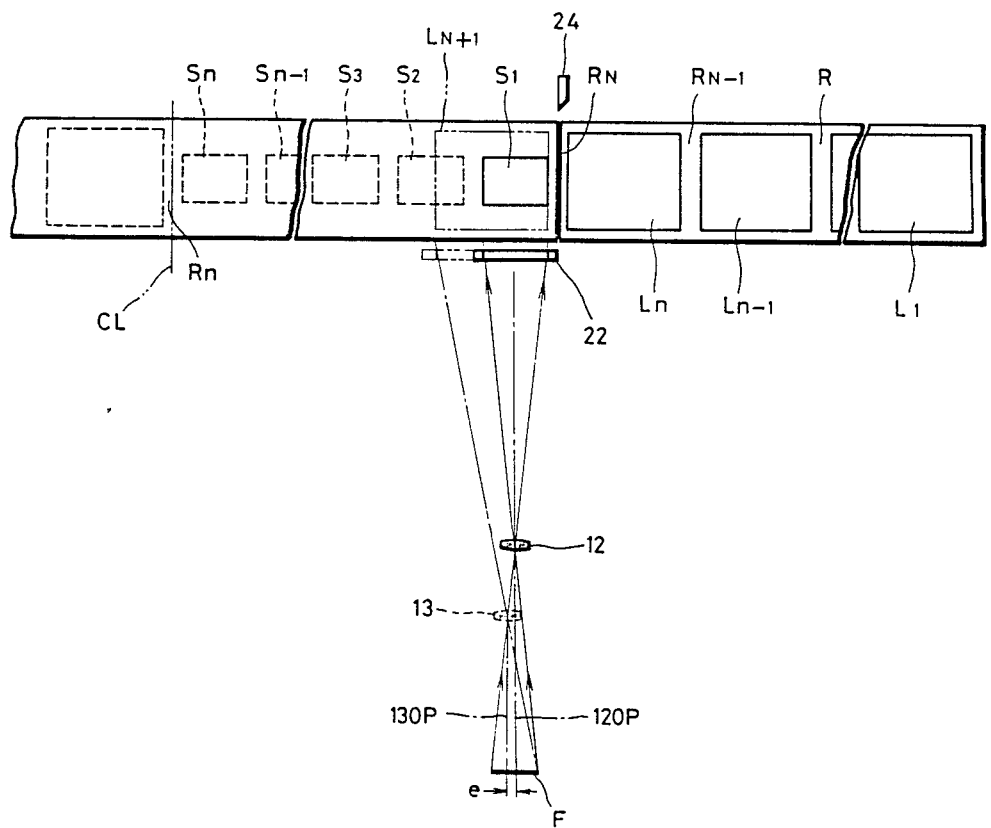
FIG. 4 is an illustration for explaining printed image frames made by the printer-processor of FIG. 2.

Although the negative film F is stationary, the printing lenses 12 and 13 have their optical axes 120P and 130P horizontally displaced by a distance e when interchanged. As a result, the printing lenses 12 and 13 project image frames S and L with their centers displaced on the photographic paper P so as to line up front edges of the image frames S and L, as shown in FIG. 4.

A cutter 24, adjacent the exposure mask 22, is actuated to cut off part of the photographic paper P when a predetermined number of image frames have been exposed by either of the printing lenses 12 and 13. This cutter 24 is fixed a precise distance from the inside edge of the fixed side frame of the exposure mask 22. This distance is usually equal to the normal width of required margin of a print. The cutter's position may be adjusted to vary the normal width of a margin.

In operation of a printer-processor as constructed above, the lens board 4 is manually operated to change a printing image frame size. For making L-size prints L (which have a diagonal length twice that of S-size prints S), the lens board 4 is rotated to a first limit position to align the flange 13F with the mounting flange 20, in order to place the printing lens 13, with a large magnification in the projection system between the projection light unit 30 and the exposure mask 22. The negative film F may be set in the negative carrier 25 before or after the mounting of the printing lens 13. The paper feeding rollers 28 are adjusted for intermittent withdrawal of the photographic paper P by a length equal to the total width of front and rear margins and the length of the L-size image frame.

After these preparations, a printing key (not shown) is operated to cause the white light source 31 to emit light and, simultaneously, to start the shutter controller 18 to open the shutter 19 for a proper exposure time. As is well known to those skilled in the photographic art, this proper exposure time is automatically determined in accordance with various exposure factors, such as a transmittance density of the negative film as detected by a sensor PS (see FIG. 2), the sensitivity of the photographic paper P, etc. As a result, a L-size latent image $L_1$ is formed on the photographic paper P. When the shutter 19 is closed, the white light source is dimmed and, simultaneously, the paper feeding rollers 28 are actuated to withdraw the photographic paper P from the magazine 26 so as to place an unexposed part of the photographic paper in the exposure station defined by the exposure mask 22 and the pressure plate 23. The negative film F then is advanced by one image frame.

The above-describing printing operation is repeated to expose a predetermined number of image frames, so as to form L-size latent images $L_1, \ldots, L_n$ on the photographic paper P. As shown in FIG. 4, between adjacent L-size image frames, there is left a margin R. During the repetition of this printing operation, the exposed part of the photographic paper P is intermittently transported, without being cut, into the processing section 34, and is stored temporarily therein in the form of a plurality of loops. After printing of all of the predetermined number of L-size image frames, the cutter 24 is actuated to cut the exposed part of the photographic paper P with half of the margin $R_n$ left behind the last L-size latent image $L_n$.

After cutting of the exposed part of the photographic paper P, the exposed photographic paper is transported through the processing section 34 along a looped path shown by chained line in FIG. 2 to be subjected therein to developing, bleaching-fixing, washing and drying in this order. As a result, images of the L-size latent image frames are reversed into positive images. This processed photographic paper is P then transported to the cutter unit 35 and cut by frame so as to provide individual prints PL. This cutter unit 35 cuts the photographic paper P along the center line between adjacent L-size image frames, leaving one-half of the margin R behind each L-size image frame L.

S-size prints (which have an image frame with one-half the diagonal length of the L-size prints) are to be printed from the negative film F, the lens board 4 is operated to select the printing lens 12 which provides a small magnification. To make this lens selection, the lens board 4 is turned counterclockwise toward its opposite limit position so as to align the flange 12F with the mounting flange 20. As a result of this lens alignment, as shown in FIG. 4, the printing lens 12 is placed in the printing optical path with its optical axis 120P displaced a distance e from an axis 130P of the printing lens 13. As a result, an S-size image frame $S_1$ is projected with a margin of the same width as the margin left behind the last L-size image frame $L_n$.

The front edge of the S-size image frame $S_1$ is aligned with where the rear edge of a rear end margin of a L-size image frame would be if it were printed in place of the S-size image frame $S_1$. Either manually or simultaneously with this turning operation of the lens board 4, the variable exposure mask 22 is adjusted to reduce its opening size to match the S-size image frame. The paper feeding rollers 28 are adjusted for withdrawal of the photographic paper P by a length equal to one S-size print.

After these adjustments, the printing key is operated to repeat the same printing operation as in printing L-size image prints, forming consecutively S-size latent images $S_1, \ldots, S_{n-1}$, and $S_n$ on the photographic paper P. After the printing of a required number of S-size image frames, the cutter is actuated to cut the exposed part of the photographic paper P along a center line CL of the rear end margin $R_n$ of the S-size image frame $S_n$. The cut exposed part of the photographic paper P is processed in the processing section 34 of the printer-processor 10, in the same manner as for the L-size prints, and then is cut along the center line of each margin between adjacent S-size image frames by the cutter unit 35 to provide individual S-size prints. It is to be noted that the cutter unit 34 is synchronized with the paper feeding rollers 28 to cut automatically the exposed photographic paper P along the center line of a margin between adjacent image frames. As a result, the photographic paper can be fully automatically continuously dealt from exposure to cutting.

Figure 5:
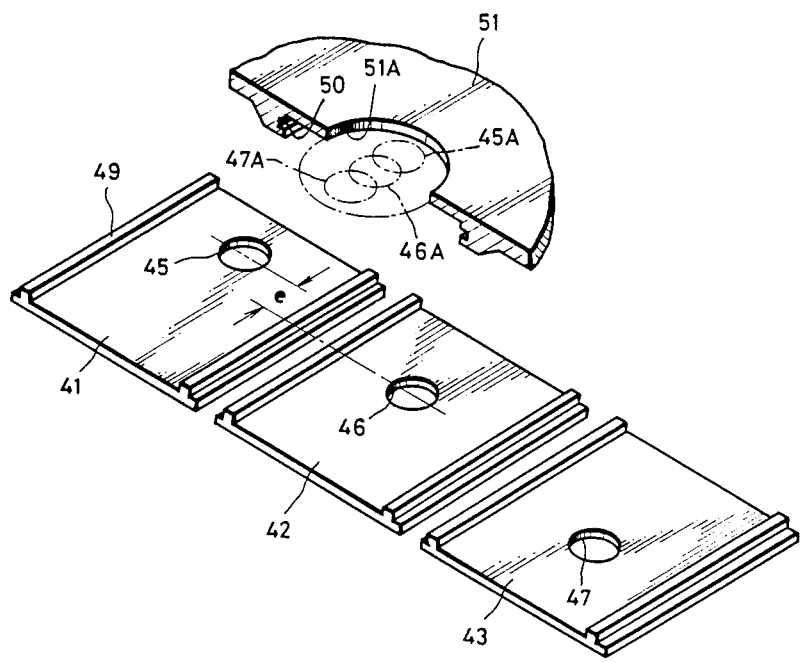
FIG. 5 is an exploded schematic illustration showing another example of the print lens mounting device incorporated in the printer-processor of FIG. 2.

FIG. 5 shows another preferred embodiment of the present invention in which a plurality of lens mounting boards are used for printing lenses having different focal lengths or magnifications. There are a plurality of lens boards 41, 42 and 43, one for each printing lens (not shown). The lens boards 41, 42 and 43, all of which have the same configuration, are provided with guide rails 49 on opposite sides and have openings 45, 46 and 47, respectively formed at different locations therein. When these lens boards 45, 46, 47 are interchangeably mounted by being slidingly inserted into guide grooves 50 formed in the lens board 51, each opening 45, 46, 47 is positioned at different positions 45A, 46A, 47F with respect to an opening 51A formed in the lens holder 51. Also in this embodiment, the optical axes of the printing lenses are perpendicular to the photographic paper P and their exposure axes are inclined at different angles according to their magnifications when they are mounted to the housing of the printing section 11. As is apparent, different sizes of image frames can be printed on the photographic paper P with their front edge located a predetermined distance from the cutting line, so that different sizes of prints can be formed with identical front and rear margins.

Although the description of the foregoing embodiments has been directed to a black-and-white printer printer-processor, the present invention can be embodied in a color printer-processor which utilizes three color filters for controlling three color components of printing light in order to make proper exposures.

Finally, the present invention is not to be considered as limited to the embodiments described above. Rather, the scope of the invention is limited only by the appended claims which follow immediately. Many variations within the scope of the present invention will be apparent to the ordinarily skilled artisan.

What is claimed is:

1. A photographic printer having an exposure station, and a cutter disposed adjacent thereto for cutting an exposed part of a photographic paper on which an image is projected, said photographic printer further comprising:

a plurality of printing lenses providing different degrees of magnification; and means for selectively mounting each of said plurality of printing lenses on said photographic printer such that an exposure axis of each of said printing lenses is inclined at an angle in accordance with its magnification with respect to a plane on which said each of said printing lenses projects an image.

2. A photographic printer as defined in claim 1, wherein an optical axis of each of said printing lenses is perpendicular to said plane.

3. A photographic printer as defined in claim 1, wherein said plurality of printing lenses includes a printing lens having an exposure axis perpendicular to said plane.

4. A photographic printing lens as defined in claim 3, wherein said printing lens which has an exposure axis perpendicular to said plane provides the smallest degree of magnification.

5. A photographic printer as defined in claim 1, wherein said mounting means comprises a single lens holder on which all of said plurality of printing lenses are mounted.

6. A photographic printer as defined in claim 1, wherein said mounting means comprises a plurality of lens holders, one for each of said printing lenses, said plurality of lens holders being interchangeably mounted on said photographic printer.

7. A photographic printer as defined in claim 1, wherein, for each of said printing lenses, said exposure axis is a straight line connecting a center of each of said printing lenses and an image frame projected thereby.

8. A photographic printer as defined in claim 5, wherein said single lens holder comprises a V-shaped mounting board on which said plurality of printing lenses are mounted, said V-shaped mounting board being rotated around an axis passing through a vertex of said V-shaped mounting board to position a desired one of said plurality of mounting lenses selectively.

9. A photographic printer as defined in claim 8, wherein said plurality of printing lenses comprises two of said printing lenses, each of lenses being positioned on opposite legs of said V-shaped mounting board extending from said vertex.

* * * * *